United States Patent [19]
Manuel et al.

[11] Patent Number: 5,924,245
[45] Date of Patent: Jul. 20, 1999

[54] VEHICLE DOOR HARDWARE

[75] Inventors: Mark Manuel, Clinton Township; James Edward Ochenski, Warren; Harry Duane Miller, Canton; Waldemar Wawrzyniec Gmurowski, Sterling Heights; Timothy Bartholomew Madeja, Pontiac, all of Mich.

[73] Assignee: General Motors Corporation, Detroit, Mich.

[21] Appl. No.: 08/819,786

[22] Filed: Mar. 18, 1997

[51] Int. Cl.⁶ ..................................................... E05F 11/48
[52] U.S. Cl. ................................................. 49/352; 49/502
[58] Field of Search ............................. 49/352, 349, 348, 49/502

[56] References Cited

U.S. PATENT DOCUMENTS

| | | |
|---|---|---|
| Re. 26,281 | 10/1967 | Werner . |
| 1,671,433 | 5/1928 | McAdam . |
| 1,696,921 | 1/1929 | Nicholson . |
| 3,181,857 | 5/1965 | Werner . |
| 3,280,509 | 10/1966 | Werner . |
| 3,392,488 | 7/1968 | Werner . |
| 3,427,748 | 2/1969 | Marr . |
| 3,681,874 | 8/1972 | Golde et al. . |
| 3,831,320 | 8/1974 | Dauernheim et al. . |
| 3,890,743 | 6/1975 | Eckhardt et al. . |
| 3,897,654 | 8/1975 | Kouth et al. . |
| 3,930,339 | 1/1976 | Jander . |
| 4,004,371 | 1/1977 | Podolan et al. . |
| 4,020,593 | 5/1977 | Salomon et al. . |
| 4,074,463 | 2/1978 | Colanzi . |
| 4,119,341 | 10/1978 | Cook . |
| 4,199,899 | 4/1980 | Muhling et al. . |
| 4,237,656 | 12/1980 | Hess et al. . |
| 4,241,542 | 12/1980 | Podolan et al. . |
| 4,314,692 | 2/1982 | Brauer et al. . |
| 4,433,509 | 2/1984 | Seppala . |
| 4,440,354 | 4/1984 | Kobayashi et al. ............... 49/352 X |
| 4,441,276 | 4/1984 | Chikaraishi . |
| 4,468,887 | 9/1984 | Koch . |
| 4,630,398 | 12/1986 | Schust . |
| 4,633,613 | 1/1987 | Kobayashi et al. . |
| 4,642,941 | 2/1987 | Staran et al. . |
| 4,785,582 | 11/1988 | Tokue et al. . |
| 4,788,795 | 12/1988 | Pinsonneault . |
| 4,821,589 | 4/1989 | Fukumoto et al. . |
| 4,835,907 | 6/1989 | Heuchert . |
| 4,924,627 | 5/1990 | Lam et al. . |
| 4,934,099 | 6/1990 | Maekawa et al. . |
| 4,937,977 | 7/1990 | Gergoe et al. . |
| 5,067,281 | 11/1991 | Dupuy . |
| 5,076,014 | 12/1991 | Cuyl . |
| 5,226,259 | 7/1993 | Yamagata et al. . |
| 5,308,129 | 5/1994 | Hlavaty . |
| 5,367,832 | 11/1994 | Compeau et al. . |
| 5,377,450 | 1/1995 | Varajon . |
| 5,379,553 | 1/1995 | Kimura et al. . |
| 5,623,785 | 4/1997 | Mariel ..................................... 49/352 |
| 5,657,580 | 8/1997 | Kobrehel .................................. 49/352 |

*Primary Examiner*—Jerry Redman
*Attorney, Agent, or Firm*—Michael J. Bridges; Kathryn A. Marra

[57] ABSTRACT

An apparatus for installing a window, a window drive mechanism, and a latch carrier mechanism within a vehicle door includes a one-piece cable regulator having a molded passage thereabout for guiding at least one length of cable between the window and the window drive mechanism, a molded vertical passage for guiding motion of the window, a molded cantilever beam for contacting and gradually reducing the downward motion of the window near a window stop position and a molded guide for slideable cooperation with the door latch carrier, whereby the door latch carrier, once slideably secured within the guide, may be shifted over the cable regulator to a compact shipping and installation position, and then may be shifted outward from the cable regulator to a final assembly position within the door.

10 Claims, 4 Drawing Sheets

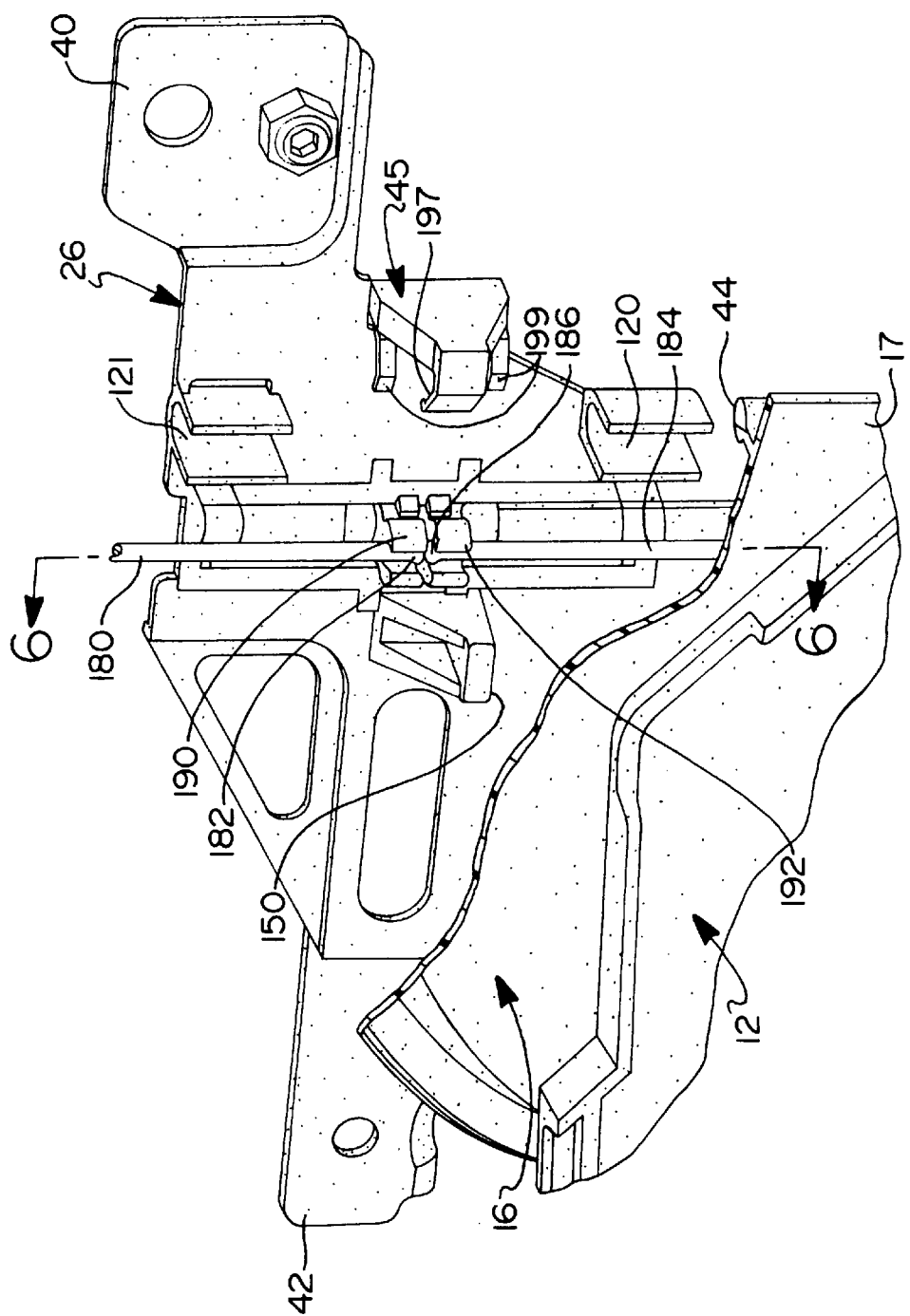

VEHICLE DOOR HARDWARE

TECHNICAL FIELD

This invention relates to automotive vehicle door hardware including a single piece cable regulator assembly, a latch carrier assembly and a window carrier assembly.

BACKGROUND OF THE INVENTION

Conventional automotive vehicle door hardware, including cable regulators and latch and window carriers are characterized by a large number of parts and inflexible assembly procedures. Cable regulators alone may include ten or more parts. After assembly of such parts, a latch carrier assembly, including a door handle, a door latch and connecting rod hardware, is commonly inflexibly fastened to the cable regulator. The inflexible combination of the cable regulator and latch carrier, which typically must be delivered as a package for assembly into a vehicle door, is unwieldy and requires special handling procedures, adding to process costs. Such a cumbersome combination can be difficult to install into the interior of the door, leading to large door openings and complex assembly procedures.

Vehicle door hardware having a reduced number of parts, and providing for ease of shipping and assembly would therefore be desirable.

SUMMARY OF THE INVENTION

The present invention is directed to low cost, durable vehicle door hardware providing for ease of handling, shipping and assembly into a vehicle door. More specifically, the hardware includes a one piece cable regulator including integral window regulator cable guides, shields, and grooves molded thereon. In accord with a further aspect of this invention, a window bottom stop is molded on the one-piece cable regulator in the form of a compliant cantilevered beam. The bottom stop is positioned to contact and to be deflected by a window passing through a bottom window position and, through an opposing deflection force imparted to the window, gradually decelerate the window to a stop.

In accord with yet a further aspect of this invention, the cable regulator includes integral guides sized to slideably receive corresponding guides on a latch carrier mechanism for a slideable coupling of the latch carrier mechanism and the cable regulator, forming a flexible door hardware assembly. The relative position of the cable regulator and the latch carrier mechanism may then be adjusted during shipping and assembly to ease packaging and process constraints. A relatively compact assembly may be provided by shifting the latch carrier mechanism over the cable regulator, which may be efficiently shipped, handled and inserted into the vehicle door. When convenient, such as following insertion into the vehicle door, the latch carrier may be shifted outward from the cable regulator to an extended position required for final assembly within the door. In accord with still a further aspect of this invention, the vehicle door hardware includes a window carrier assembly mounted to the frame of the cable regulator and having tensioning springs which allow a significant amount of window cable lash take-up over a relatively small amount of space.

BRIEF DESCRIPTION OF THE DRAWINGS

The invention may be best understood by reference to the preferred embodiment and to the drawings in which:

FIG. 5 is an enlarged perspective view of an upper portion of the vehicle door hardware of FIG. 2, with a portion of the cable regulator assembly of FIG. 2 cut away to illustrate further detail of the window carrier assembly of the preferred embodiment.

DESCRIPTION OF THE PREFERRED EMBODIMENT

Figure 1:
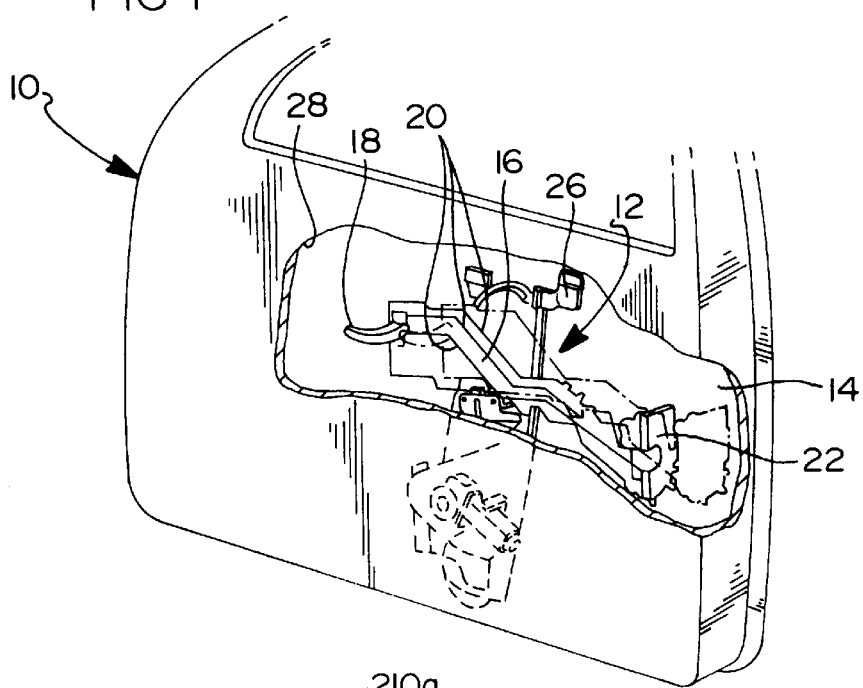
FIG. 1 is a perspective view of an installation of the vehicle door hardware of the preferred embodiment including a single piece cable regulator assembly, door latch carrier assembly and window carrier assembly into a vehicle door interior cavity.

Referring to FIG. 1, a cutaway perspective view of an installation of door hardware in interior recess 14 of an automotive vehicle door 10 generally illustrates a latch carrier assembly 12 with interior door handle assembly 18, door latch assembly 22 and operating rods 20 extending between the door handle assembly 18 and the door latch assembly 22. FIG. 1 is an interior view from the direction of an interior of an automotive vehicle on which the door 10 is installed. The latch carrier assembly 12 is slideably mounted on a molded single piece cable regulator assembly 16 which is bolted to the door 10. A window carrier assembly 26 is slideably associated with the cable regulator assembly 16 for carrying a glass window panel (not shown). The single piece cable regulator assembly 16 is molded from a glass-reinforced plastic material, such as Petra 110. The latch carrier assembly 12 may be molded from any conventional plastic material. The window carrier assembly 26 is formed from extruded aluminum with molded plastic elements, to be described, secured thereto in any suitable conventional manner. The latch carrier assembly 12 is shown in an assembly position in FIG. 1 shifted over the cable regulator assembly 16 reducing overall package size to facilitate delivery of the combination of latch carrier assembly 12 and cable regulator assembly 16 to the site for final assembly, and to facilitate insertion of the combination into the interior recess 14 of the door, reducing complexity and time of assembly, and beneficially reducing the required size of a machined door opening (not shown) through which the combination must be inserted during assembly.

Figure 2:
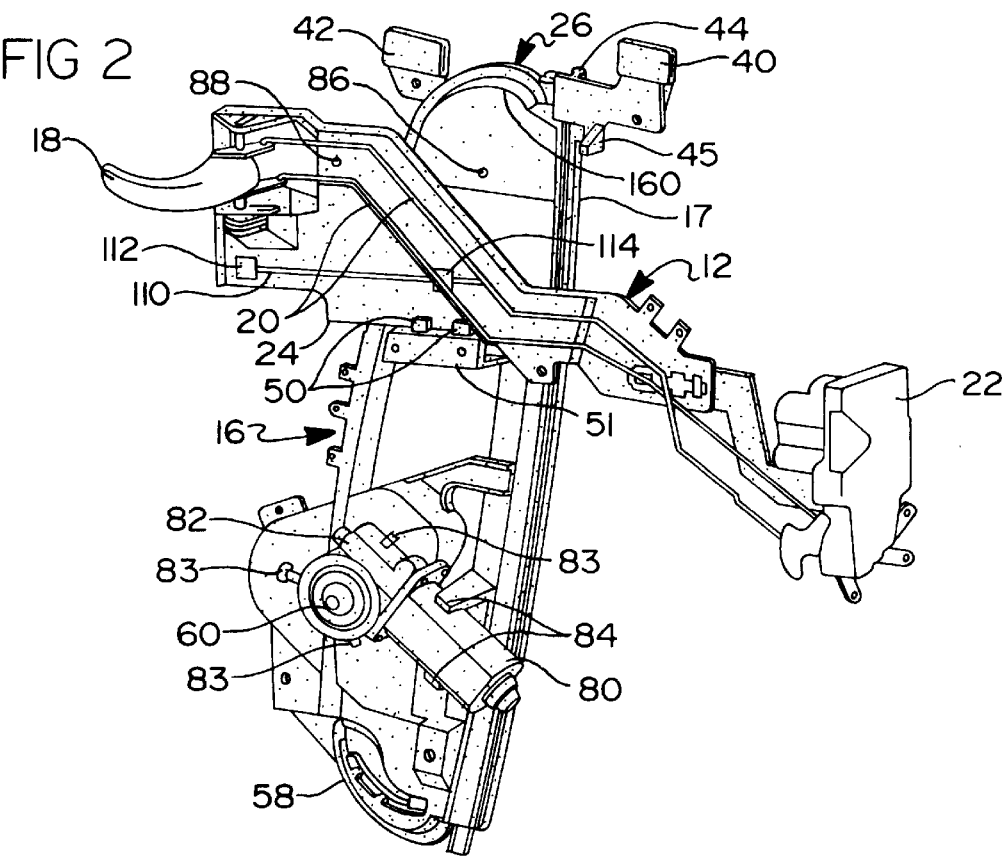
FIG. 2 is a perspective view of an arrangement of the vehicle door hardware of FIG. 1 in a convenient assembly and shipping orientation.
Figure 3:
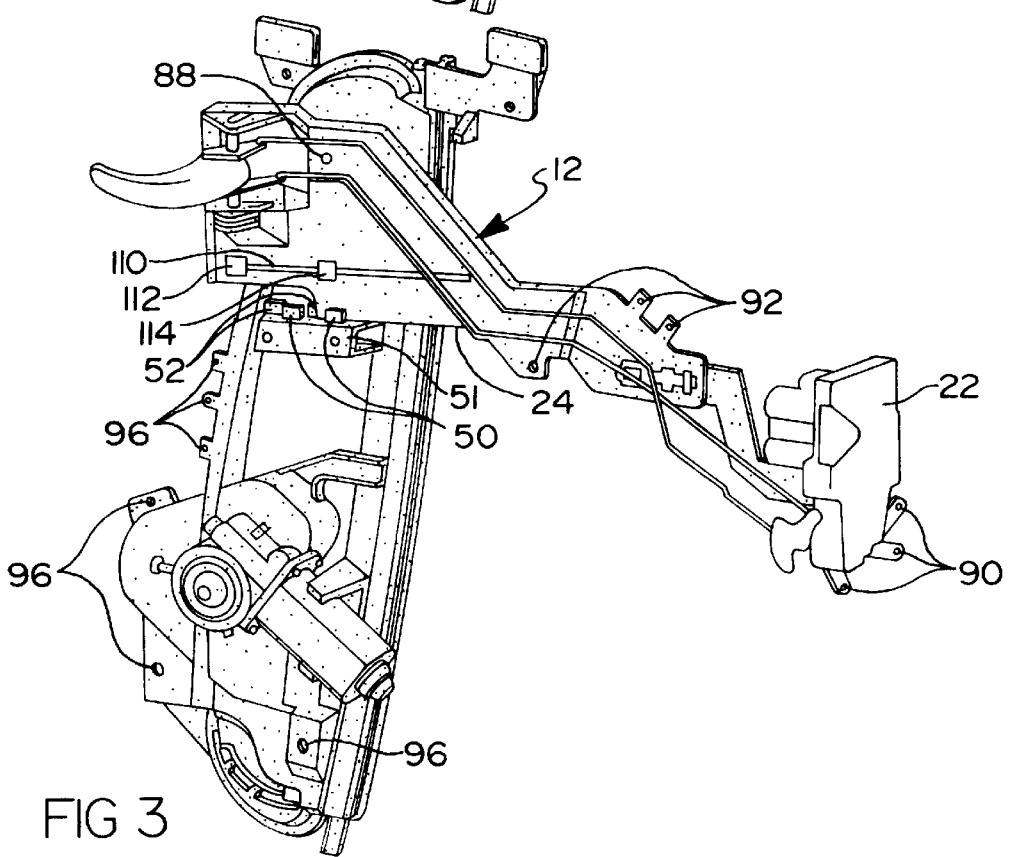
FIG. 3 is a perspective view of an arrangement of the vehicle door hardware of FIG. 1 shifted from the orientation of FIG. 2 to a final assembly body position orientation.

Referring to FIG. 2, an enlarged perspective view of the door hardware of FIG. 1 in the assembly position details the combination of the cable regulator assembly 16 with window carrier assembly 26 and latch carrier assembly 12 having interior door handle assembly 18 operatively connected to door latch assembly 22 via operating rods 20. The view of FIG. 2, as well as the view of FIGS. 1 and 3 is an interior view, taken from the direction of the interior of the automotive vehicle (not shown) on which the hardware is installed, with the door 10 of FIG. 1 in a closed position. The latch carrier assembly 12 is illustrated in an assembly position wherein a substantially straight lower edge or guide 24 of the latch carrier assembly 12 is slideably inserted along a latch guide in the form of a channel formed between an aligned row of spaced outer teeth 50 and an aligned row of spaced inner teeth (not shown), the outer and inner teeth upwardly protruding from shelf 51, with the outer and inner teeth and the shelf molded into the single piece cable regulator assembly 16 of this embodiment. The spacing between the row of outer teeth 50 and the row of inner teeth is slightly greater than the width of the lower edge 24 of the latch carrier assembly 12 providing that the outer and inner rows of teeth will securely maintain the latch carrier assembly in position relative to the cable regulator assembly 16 throughout delivery of the combination thereof and throughout the assembly process.

Stud 114 protrudes from a beam 54 (FIG. 4) of the cable regulator assembly 16 and is generally of a "T" shape, with a neck extending outwardly from the cable regulator assembly 16 and terminating in a flat head (not shown in FIG. 3). The stud 114 is positioned to be inserted through a corresponding hole 112 in the latch carrier assembly 12 during an assembly process, with the hole opening into a relatively narrow slot 110 along the latch carrier assembly 12. The hole 112 is of slightly greater cross-section than the head of the stud 114, the cross section of the head of the stud 114 significantly exceeds the width of the slot 110 so as to overlap the slot width, and the neck (not shown) of the stud is sized to fit within the slot 110. Such an arrangement allows for insertion of the stud 114 through the hole 112 during an assembly process and a shifting of the latch carrier assembly 12 relative to the cable regulator assembly 16 in direction to allow the head of stud 114 to slide over the slot 110, with the neck of the stud sliding within the slot while the lower edge 24 of the latch carrier assembly 12 slides between the aligned rows of teeth 50 and 52. The result is a secure engagement of the latch carrier assembly 12 and cable regulator assembly 16 with slideable cooperation therebetween throughout the assembly process to provide packaging benefits in accord with an important aspect of this invention. A mounting hole 86 passes through the cable regulator assembly 16 and a corresponding mounting hole 88 passes through the latch carrier assembly 12. The holes 86 and 88 are in position to be aligned when the latch carrier assembly 12 is shifted away from the cable regulator assembly 16 to a final assembly orientation as will be described, with a single attachment element, such as a screw, passing through the holes 86 and 88 to further secure the latch carrier assembly 12 relative to the cable regulator assembly 16. The described assembly orientation of the latch carrier assembly 12 and cable regulator assembly 16 reduces the overall package size of the combination, facilitating delivery and assembly thereof into the door, as described. Window carrier assembly 26 is shown at an upper end 16a of the cable regulator assembly 16 and includes integral seats 40 and 42 for receiving a glass panel (not shown). A vertical guide 44 is molded along the length of the cable regulator assembly for slideable insertion into at least one window carrier slot (not shown in FIG. 2) molded into the window carrier assembly 26. A slotted guide 45 is molded into the window carrier assembly 26 in position to receive an edge 17 of the cable regulator assembly 16 and to slide along the edge 17 as the guide 44 slides along the window carrier slot or slots, thereby substantially restricting relative motion of the window carrier assembly 26 relative to the cable regulator assembly 16 to a single degree of freedom.

A window drive mechanism or device in the form of a rotary actuator 80 of the DC motor or DC brushless motor type is secured to the cable regulator assembly 16 via clamps 84 and spring clips 83, with the clamps molded into the cable regulator assembly 16 and the spring clips secured thereto in any suitable conventional manner. The actuator 80 includes an output shaft 82 linked, such as through a standard ring and pinion assembly (not shown) to a cable drive bobbin 60 to rotationally drive the bobbin in response to manual drive commands issued by a window operator. A first and second section of a coated cable (not shown), such as in the form of a steel braided cable having a nylon coating, terminate at first ends in the window carrier assembly 26 with second cable ends, opposing the first cable ends, secured to and wound in opposite directions around bobbin 60. A channel 58 is molded into the cable regulator assembly 16 about at least a portion of its periphery, providing a guide path for the first and second coated cable sections.

The first and second cable sections are positioned during an assembly process to extend between the window carrier assembly 26 and the bobbin 60 along the channel 58. Rotation of the bobbin 60 in response to manual drive commands draws in and winds one of the cable sections around the bobbin 60 while extending and unwinding the other of the cable sections, allowing the coated cable sections to slide along the channel 58 to raise or lower the window carrier assembly 26. In accord with an important aspect of this invention, the channel 58 forming the cable guide path is molded into the single piece cable regulator assembly, such as through a gas assist molding process, reducing part count, decreasing manufacturing cost and complexity, and increasing durability.

FIG. 3 illustrates a perspective view of the combination of the cable regulator assembly 16 with window carrier assembly 26 and latch carrier assembly 12 of FIG. 3, but with the latch carrier assembly 12 shifted out from the cable regulator assembly 16 to the final assembly position. For example, the latch carrier assembly 12 may be shifted to the final assembly position after the cable regulator assembly 16 has been secured to a door panel through a suitable assembly process via assembly holes 96, contributing to a convenient procedure for inserting a compact package into an opening of a door, and for flexibility in positioning the latch carrier assembly 12 while the process of securing the cable regulator assembly 16 is taking place.

The final assembly position is provided for by pulling the latch carrier assembly 12 to an extended position protruding outward from the cable regulator assembly 16, with the neck (not shown) of stud 114 sliding along the slot 110 in a direction away from the hole 112 and with the lower edge 24 sliding between the aligned row of spaced inner teeth 52 and the aligned row of spaced outer teeth 50, the teeth protruding upwardly from the shelf 51. In such final assembly position, the holes 86 and 88 are aligned and an attachment element, such as a screw passes through the holes and is driven to a threaded receptacle in the door (not shown). The latch carrier assembly 12 may be positioned on an interior side of an inner door sheet metal panel (not shown), and the cable regulator assembly 16 may be positioned on an exterior side of the inner door sheet metal panel opposing the interior side thereof, whereby upon securing the cable regulator assembly 16 to the latch carrier assembly 12 via the attachment element, the inner door sheet metal panel will be sandwiched therebetween, with the inner door sheet metal panel having a hole aligned with the holes 86 and 88. The door latch assembly 22 may be secured, via assembly holes 90 to the door 10 (FIG. 1) and the latch carrier assembly 12 may be further secured to the interior of the door 10 (FIG. 1) via assembly holes such as holes 92, or other suitably positioned holes as is generally understood in the art.

Figure 4:
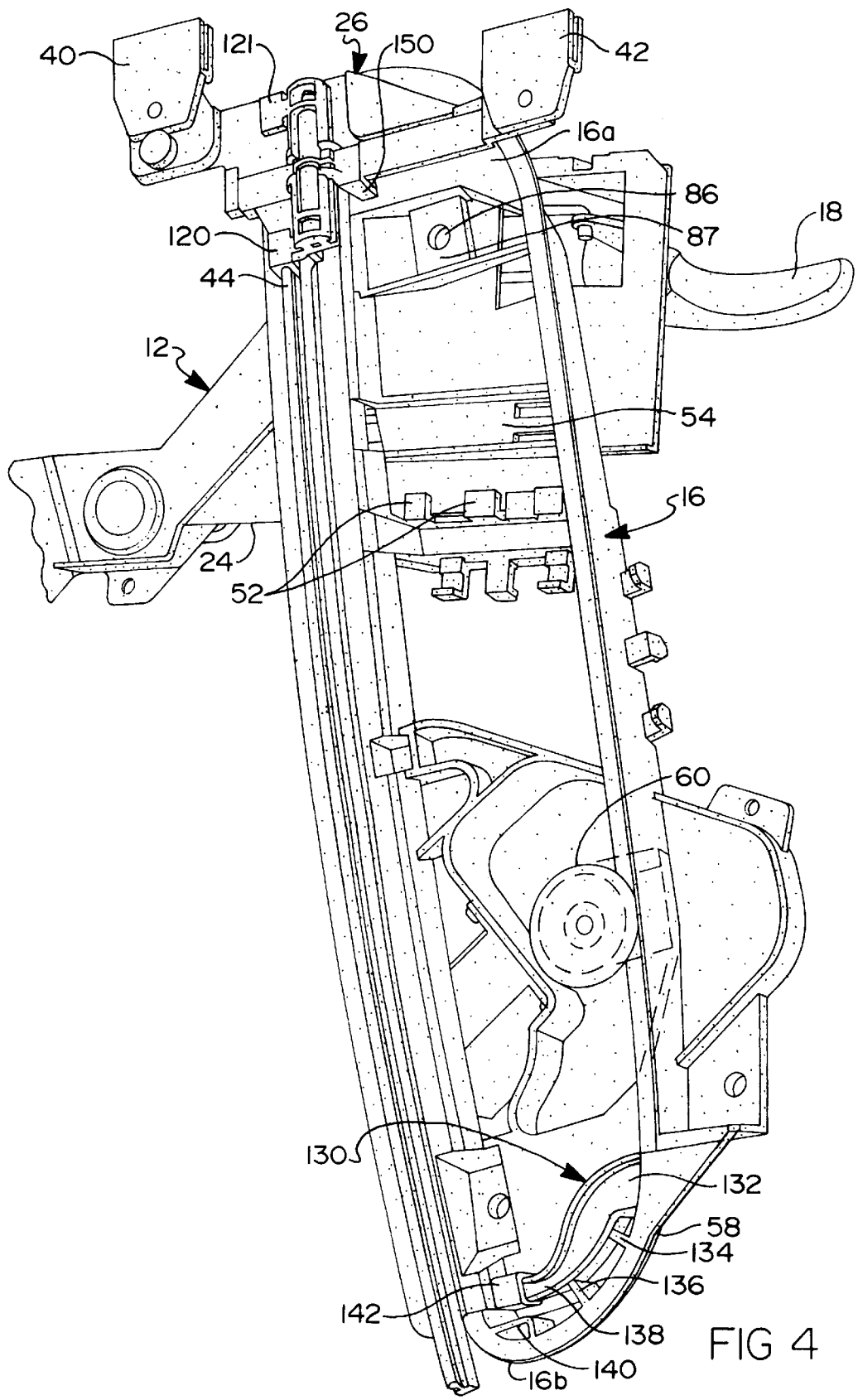
FIG. 4 is an exterior perspective view of the vehicle door hardware of FIG. 3.

FIG. 4 is an exterior perspective view of the combination of the cable regulator assembly 16 with the latch carrier assembly 12 and window carrier assembly 26 of FIG. 2, for example from a direction exterior to the automotive vehicle on which the hardware of this embodiment is installed, to illustrate features of said combination from an angle of view opposite that of FIGS. 1–3. The vehicle door hardware of FIG. 4 is shown in the final assembly orientation corresponding to that of FIG. 3, with lower edge 24 of the latch carrier assembly 12 slideably positioned between the aligned inner row of teeth 52 and the aligned outer row of teeth (not shown). Window carrier assembly 26 is secured to an upper end 16a of the cable regulator assembly 16 and includes integral seats 40 and 42 for receiving a glass panel (not shown) and upper and lower window carrier guides in the form of slots 121 and 120, respectively, of a size corresponding to the cross-section of the vertical guide 44 which is seated in the window carrier slots 120 and 121 to slide therealong. The window carrier slots 120 and 121 are molded into the window carrier assembly 26. The rotary actuator 80 of the DC motor or DC brushless motor type rotationally drives bobbin 60 on which is wound, in opposing directions, first and second lengths of coated cable (not shown), as described. A compliant bottom stop 130 in the form of a tapered arcuate cantilever beam integral with the cable regulator assembly 16 comprises a first end 132 molded into the cable regulator assembly 16 at a lower cable regulator assembly end 16b opposing the upper end 16a thereof, and is tapered into a terminal end 138 which opposes the first end 132 and about which is secured a rubber collar 142. The rubber collar 142 is positioned adjacent the vertical guide 44 so that when the window carrier assembly 26 is lowered to a predetermined bottom position at a substantially constant downward rate of movement, a stud 150 integral to the window carrier assembly 26 will contact the rubber collar 142 and will apply a deflection force to the bottom stop 130 deflecting the bottom stop in a downward direction toward a lower end 16b of the cable regulator assembly 16. The deflection force is resisted by an opposing upward spring force of the cantilever beam (or bottom stop 130). The effective length of the cantilever beam is reduced as the bottom stop is deflected sufficiently to contact a first substantially rigid support member 134, reducing the compliance of the bottom stop 130, and increasing the opposing upward spring force, so as to reduce the net downward deflection force and thus the rate of downward movement of the window carrier assembly 26 and window glass panel (not shown). The effective length of the cantilever beam is further reduced as the bottom stop 130 is further deflected due to the net downward deflection force sufficiently to contact a second substantially rigid support member 136, further reducing the compliance of the bottom stop 130, and further increasing the opposing upward spring force, so as to further reduce the net deflection force and thus the rate of downward movement of the window carrier assembly 26 and window glass panel (not shown). Finally, the bottom stop 130 is deflected in a downward direction under the net downward deflection force sufficiently for rubber collar 142 to contact a third substantially rigid support member 140 to substantially prevent further downward movement of the window carrier assembly 26. The graduation in opposing upward spring force offered through the bottom stop 130 and the series of support members 134, 136, and 140 provides for deceleration of the downward movement of the window carrier assembly 26 and window glass panel (not shown), avoiding abrupt load changes at a bottom stop position, and thereby reducing stress applied to such parts as the actuator 80 (FIG. 2), bobbin 60, the first and second lengths of coated cable (not shown) and the window carrier assembly 26, significantly increasing component durability in accord with an aspect of this invention. Such is provided substantially in a single piece cable regulator assembly 16 in accord with an important aspect of this invention. Mounting hole 86 passes through a beam 87 molded into the cable regulator assembly 16.

Referring to FIG. 5, an enlarged interior perspective view of the vehicle door hardware of FIG. 2 including the latch carrier assembly 12 with a partial cut-away view of the cable regulator assembly 16 to further detail features of the window carrier assembly 26. Window carrier assembly 26 includes integral seats 40 and 42 for receiving a glass panel (not shown) and upper and lower window carrier slots 121 and 120, respectively, of a size corresponding to the cross-section of the vertical guide 44 with the vertical guide seated within the slots 121 and 120 to slide therealong. The window carrier slots 120 and 121 may be molded into the window carrier assembly 26. The slotted guide 45 is molded into the window carrier assembly 26 and includes an outer arm 197 and a pair of inner arms 199 forming a slot between the inner and outer arms for slideably receiving the edge 17 of the cable regulator assembly 16. The edge 17 is maintained within the slot formed between the inner arms 199 and the outer arm 197 along the range of motion of the window carrier assembly 26 relative to the cable regulator assembly 16 and cooperates with the window carrier slots 120 and 121 and the vertical guide 44 to substantially restrict motion of the window carrier assembly 26 relative to the cable regulator assembly 16 to a single degree of freedom. A first section of coated cable 180 terminates, at a first end in a bulbous cable end fitting 182 retained in an upper seat 190. A second section of coated cable 184 terminates, at a first end in a bulbous cable end fitting 186 retained in a lower seat 192, which is secured, in a spring loaded manner, to be described, to the upper seat 190. The upper and lower seats 190 and 192 are provided to maintain the first and second cable sections 180 and 184 in tension throughout the range of travel of the window carrier assembly 26 relative to the cable regulator assembly 16, as will be further detailed.

Figure 6:
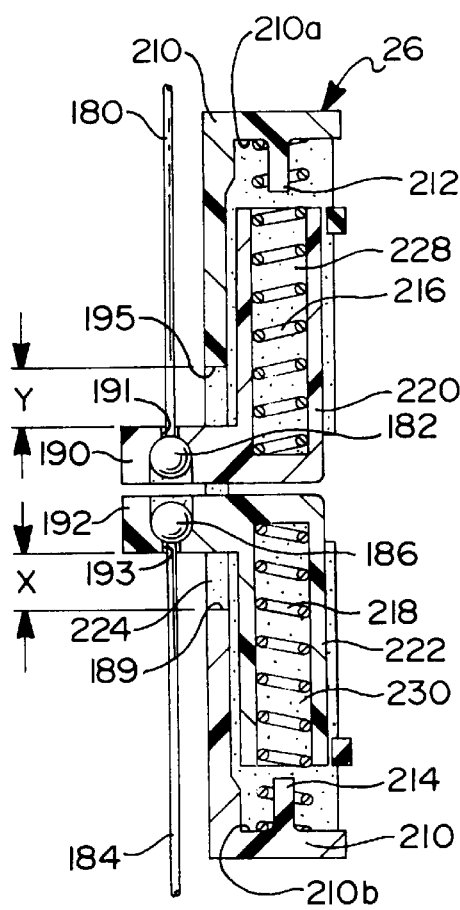
FIG. 6 is a top cutaway view of the window carrier assembly of FIG. 5 taken along reference 6—6.

Referring to FIG. 6, side cutaway view of a portion of the window carrier assembly 26 taken along reference 6—6 of FIG. 5 illustrates a compact cable tensioning feature. in which both the first and second cable sections 180 and 184 are maintained in tension throughout the range of motion of the window carrier assembly 26. More specifically, the window carrier assembly 26 includes a hollow member 210 with a central passage 224, defined between an upper edge 195 and a lower edge 189 in the hollow member 210, into the interior of the hollow member 210. Upper and lower "L" shaped members, 220 and 222, respectively, are positioned within the interior of the hollow member 210 with a horizontal hollowed-out section of the respective members 220 and 222 extending through the central passage 224, the hollowed-out sections of the members 220 and 222 forming respective upper and lower seats 190 and 192 for receiving respective end fittings 182 and 186 of the first and second sections of cable 180 and 184. Each of the upper and lower seats 190 and 192 include a passage 191 and 193 respectively, through which passages the respective sections of cable 180 and 184 are drawn. The upper and lower "L" shaped members 220 and 222, respectively, include respective bores 228 and 230 through a portion of the vertical section thereof, with respective coil springs 216 and 218 received in the bores 228 and 230. The springs 216 and 218 extend out of the bores and seat in respective upper and lower spring seats, 212 and 214. Upper spring seat 212 extends in a downward direction from a ceiling 210a of the hollow member 210 and the lower spring seat 214 extends in an upward direction from a floor 210b of the hollow member 210. The upper and lower "L" shaped members 220 and 222 are not directly coupled, but rather are driven together by the spring force of each of the springs 216 and 218 acting against respective ceiling 210a and floor 210b of the hollow member 210. An upward force is applied by the first section of cable 180 to the upper "L" shaped member 220 which is opposed by the spring force of coil spring 216 acting against the ceiling 210a. A downward force is applied by the second section of cable 184 to the lower "L" shaped member 222 which is opposed by the spring force of the coil spring 218 acting against the floor 210b. This cable tensioning arrangement allows for a significant amount of cable tensioning in a relatively small package. For example, the arrangement of FIG. 6 corresponds to a set up position with a length "Y" of take-up of the first section of cable 180 until the upper seat 190 contacts the upper edge 195, preventing further compression of the spring 216, and a length "X" of take-up of the second section of cable 184 until the lower seat 192 contacts the edge 189, preventing further compression of the spring 218. In a fully raised or fully lowered window position, the length of cable section take-up with be the sum of "Y+X" providing for a substantial amount of cable tensioning in a relatively small package.

The preferred embodiment is not intended to limit or restrict the invention since many modifications may be made through the exercise of ordinary skill in the art without departing from the scope of the invention.

The embodiments of the invention in which a property or privilege is claimed are described as follows:

1. An apparatus in combination with a window and a window drive mechanism for mounting the window and window drive mechanism within a vehicle door and further for flexibly mounting a latch carrier assembly in the vehicle door, comprising:

a window carrier secured to the window and having a guide disposed thereon;

a length of cable coupled to the window carrier and to the window drive mechanism;

a one-piece cable regulator into which is molded a channel for guiding the length of cable between the window carrier and the window drive mechanism, with a guide molded into the one-piece cable regulator for mating with the first-recited guide to guide motion of the window carrier relative to the one-piece cable regulator, the one-piece cable regulator further including a latch guide for slideably receiving the latch carrier assembly forming a slideable relationship between the latch carrier assembly and the one-piece cable regulator, whereby the latch carrier assembly may be shifted to a compact position over the one-piece cable regulator prior to final assembly in the vehicle door and further may be shifted outward from the one-piece cable regulator to a final assembly position within the vehicle door.

2. The apparatus of claim 1, wherein the latch guide is molded into the one-piece cable regulator.

3. The apparatus of claim 1, wherein the latch guide comprises a channel molded into the one-piece cable regulator for slideably receiving an edge of the latch carrier assembly.

4. An apparatus in combination with a window and a window drive mechanism for mounting the window and window drive mechanism within a vehicle door, comprising:

a window carrier secured to the window and having a guide disposed thereon;

a length of cable coupled to the window carrier and to the window drive mechanism;

a one-piece cable regulator into which is molded a channel for guiding the length of cable between the window carrier and the window drive mechanism, with a guide molded into the one-piece cable regulator for mating with the first-recited guide to guide motion of the window carrier relative to the one-piece cable regulator; and a compliant bottom stop molded into the one-piece cable regulator in position to contact and to be deflected by the window carrier as the window carrier moves through a predetermined position relative to the one-piece cable regulator, said deflection imparting an opposing deflection force from the bottom stop to the window carrier to gradually reduce window carrier motion.

5. The apparatus of claim 4, wherein the compliant bottom stop comprises a flexible cantilever beam molded into the one-piece cable regulator and extending outward therefrom and terminating in an end portion which is positioned to contact and to be deflected by the window carrier as the window carrier moves through a bottom position with said deflection generating an opposing deflection force which increases as a function of the magnitude of the cantilever beam deflection to increasingly oppose motion of the window carrier beyond the bottom position.

6. The apparatus of claim 5, wherein the one-piece cable regulator further comprises a substantially rigid support member molded into the one-piece cable regulator adjacent the cantilever beam in position to contact the cantilever beam upon a predetermined amount of said deflection of the cantilever beam, to significantly increase the deflection force opposing the motion of the window carrier.

7. The apparatus of claim 6, wherein the one-piece cable regulator further comprises an additional substantially rigid support member molded into the one-piece cable regulator, spaced from the first-recited support member and adjacent the cantilever beam in position of contact the cantilever beam upon a predetermined additional amount of said deflection of the cantilever beam to further increase the deflection force opposing the motion of the window carrier.

8. An apparatus in combination with a window and a window drive device for installing the window and window drive device within a vehicle door, comprising:

a window carrier coupled to the window and including a motion guide;

at least one cable coupled on a first end to the window carrier and coupled on a second end to the window drive device; and a one-piece cable regulator assembly about which is molded a cable guide passage for guiding the at least one cable between the window carrier and the window drive device, the window drive device being secured to the cable regulator assembly, with a length of vertical guide molded into the one-piece cable regulator assembly and sized to mate with the motion guide to guide vertical motion of the window carrier relative to the one-piece cable regulator assembly.

9. The apparatus of claim 8, further for installing a latch carrier assembly including a door handle and a door latch mechanism within the vehicle door, wherein the one-piece cable regulator assembly further includes a latch guide for slideably mating with a corresponding guide on the door latch carrier whereby the latch carrier assembly is slideably coupled to the one-piece cable regulator for shifting the latch carrier assembly to various positions relative to the one-piece cable regulator assembly including a compact position over the one-piece cable regulator assembly prior to a final installation within the vehicle door and an outwardly-extending position from the one-piece cable regulator for final installation within the vehicle door.

10. The apparatus of claim 8, wherein the one-piece cable regulator assembly further includes a flexible cantilever beam having a base end molded into the one-piece cable regulator assembly and having a terminal end extending outward from the base end, the terminal end positioned to contact the window carrier at a first deceleration position of the window carrier relative to the cable regulator assembly to gradually reduce motion of the window carrier relative to the one-piece cable regulator assembly.

* * * * *